United States Patent
Dalsgaard et al.

(10) Patent No.: US 11,711,127 B2
(45) Date of Patent: Jul. 25, 2023

(54) METHODS, DEVICES AND COMPUTER READABLE MEDIUM FOR COMMUNICATION MEASUREMENT

(71) Applicant: NOKIA TECHNOLOGIES OY, Espoo (FI)

(72) Inventors: Lars Dalsgaard, Oulu (FI); Tero Henttonen, Espoo (FI); Li Zhang, Beijing (CN); Elena Virtej, Espoo (FI); Niko Kolehmainen, Jorvas (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 58 days.

(21) Appl. No.: 17/252,517

(22) PCT Filed: Jun. 25, 2018

(86) PCT No.: PCT/CN2018/092711
§ 371 (c)(1),
(2) Date: Dec. 15, 2020

(87) PCT Pub. No.: WO2020/000156
PCT Pub. Date: Jan. 2, 2020

(65) Prior Publication Data
US 2021/0328642 A1 Oct. 21, 2021

(51) Int. Cl.
*H04B 7/06* (2006.01)
*H04B 17/318* (2015.01)
(Continued)

(52) U.S. Cl.
CPC ......... *H04B 7/0617* (2013.01); *H04B 7/1555* (2013.01); *H04B 7/2126* (2013.01); *H04B 17/318* (2015.01)

(58) Field of Classification Search
CPC .. H04B 7/0617; H04B 7/1555; H04B 7/2126; H04B 17/318; H04B 17/309
See application file for complete search history.

(56) References Cited

U.S. PATENT DOCUMENTS

| 2013/0242784 A1 | 9/2013 | Tujkovic et al. |
| 2017/0201960 A1 | 7/2017 | Park et al. |
| (Continued) | | |

FOREIGN PATENT DOCUMENTS

| CA | 3 042 834 A1 | 5/2018 |
| CN | 106575990 A | 4/2017 |
| (Continued) | | |

OTHER PUBLICATIONS

Notice of Preliminary Rejection dated Dec. 27, 2021 corresponding to Korean Patent Application No. 2021-7002211 with English summary thereof.
(Continued)

*Primary Examiner* — Minh Trang T Nguyen
(74) *Attorney, Agent, or Firm* — Squire Patton Boggs (US) LLP

(57) ABSTRACT

Embodiments of the disclosure provide a method, device and computer readable medium for new radio management measurement. According to embodiments of the present disclosure, the network device may transmit collocation information of component carriers to the terminal device. The terminal device may perform communication measurements based on the collocation information. In this way, the measurement effort and burden of the terminal device may be reduced while flexibility of the network deployment is stilled maintained.

32 Claims, 4 Drawing Sheets

(51) Int. Cl.
  *H04B 7/155* (2006.01)
  *H04B 7/212* (2006.01)

(56) References Cited

U.S. PATENT DOCUMENTS

| | | | |
|---|---|---|---|
| 2017/0244451 A1* | 8/2017 | Raghavan | ................. H04L 7/04 |
| 2018/0049233 A1 | 2/2018 | Luo et al. | |
| 2018/0054797 A1 | 2/2018 | Islam et al. | |

FOREIGN PATENT DOCUMENTS

| | | |
|---|---|---|
| JP | 2019-118036 A | 7/2019 |
| WO | 2018/063933 A2 | 4/2018 |
| WO | 2018/082641 A1 | 5/2018 |
| WO | 2018/209179 A1 | 11/2018 |

OTHER PUBLICATIONS

ZTE, "QCL/QCB design for DL MIMO," R1-1701819, 3GPP TSG RAN WG1 Meeting #88, Athens, Greece, Feb. 7, 2017.

Nokia et al., "Summary of QCL," R1-1714970, 3GPP TSG RAN WG1 #90, Prague, Czech Republic, Aug. 26, 2017.

Ericsson, "Feature lead summary 3 for beam measurement and reporting," R1-1807782, 3GPP TSG-RAN WG1 Meeting #93, Busan, May 29, 2018.

Notice of Reasons for Rejection dated Mar. 29, 2022 corresponding to Japanese Patent Application No. 2020-572402, with English summary thereof.

First Examination Report dated Jan. 20, 2022 corresponding to Indian Patent Application No. 202147000943.

Extended European Search Report corresponding to EP Appln. No. 18924288.6, dated May 31, 2022.

International Search Report and Written Opinion dated Mar. 14, 2019 corresponding to International Patent Application No. PCT/CN2018/092711.

Decision of Final Rejection dated Oct. 11, 2022 corresponding to Japanese Patent Application No. 2020-572402, with English Summary thereof.

* cited by examiner

METHODS, DEVICES AND COMPUTER READABLE MEDIUM FOR COMMUNICATION MEASUREMENT

FIELD

Embodiments of the present disclosure generally relate to communication techniques, and more particularly, to methods, devices and computer readable medium for communication measurement.

BACKGROUND

In communication systems, such as Long Term Evolved (LTE) communication systems or the $5^{th}$ generation wireless systems (5G), in the scenario of carrier aggregation, the terminal device needs to perform the communication measurements on carrier components. Further research is still needed regarding the measurements on carrier components.

SUMMARY

Generally, embodiments of the present disclosure relate to a method for a modulation of communication measurements and the corresponding network device and terminal device.

In a first aspect, embodiments of the present disclosure provide a method implemented at a network device for communication. The method comprises: determining a first direction of beams associated with at least one component carrier. The method also comprises determining collocation information of the at least one component carrier based on the first direction. The collocation information indicates whether the at least one component carrier being collocated and information of beam direction associated with at least one component carrier. The method further comprises transmitting, to a terminal device, the collocation information of the at least one component carrier.

In a second aspect, embodiments of the present disclosure provide a method implemented at a terminal device for communication. The method comprises: receiving, from a network device, collocation information of at least one component carrier. The collocation information indicates whether the at least one component carrier being collocated and indicating information of beam direction associated with at least one component carrier. The method also comprises determining a requirement of communication measurement of the at least one component carrier based on at least one of the collocation information and the information of the first direction of beams. The method further comprises performing the communication measurement on the at least one component carrier based on the determined requirement.

In a third aspect, embodiments of the disclosure provide a network device. The network device comprises: at least on processor; and a memory coupled to the at least one processor, the memory storing instructions therein, the instructions, when executed by the at least one processor, causing the network device to perform acts including: determining a first direction of beams associated with at least one component carrier. The acts also comprise determining collocation information of the at least one component carrier based on the first direction. The collocation information indicates whether the at least one component carrier being collocated. The acts further comprises transmitting, to a terminal device, the collocation information and information of the first direction of beams associated with the at least one component carrier.

In a fourth aspect, embodiments of the disclosure provide a terminal device. The terminal device comprises: at least on processor; and a memory coupled to the at least one processor, the memory storing instructions therein, the instructions, when executed by the at least one processor, causing the terminal device to perform acts including: receiving, from a network device, collocation information of at least one component carrier. The acts also comprise determining a requirement of communication measurement of the at least one component carrier based on at least one of the collocation information and the information of the first direction of beams. The acts further comprise performing the communication measurement on the at least one component carrier based on the determined requirement.

In a fifth aspect, embodiments of the disclosure provide an apparatus for communication. The apparatus comprises means for performing the method according to the first aspect.

In a sixth aspect, embodiments of the disclosure provide an apparatus for communication. The apparatus comprises means for performing the method according to the second aspect.

In a seventh aspect, embodiments of the disclosure provide a computer readable medium. The computer readable medium stores instructions thereon, the instructions, when executed by at least one processing unit of a machine, causing the machine to implement the method according to the first aspect.

In an eighth aspect, embodiments of the disclosure provide a computer readable medium. The computer readable medium stores instructions thereon, the instructions, when executed by at least one processing unit of a machine, causing the machine to implement the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Figure 2:
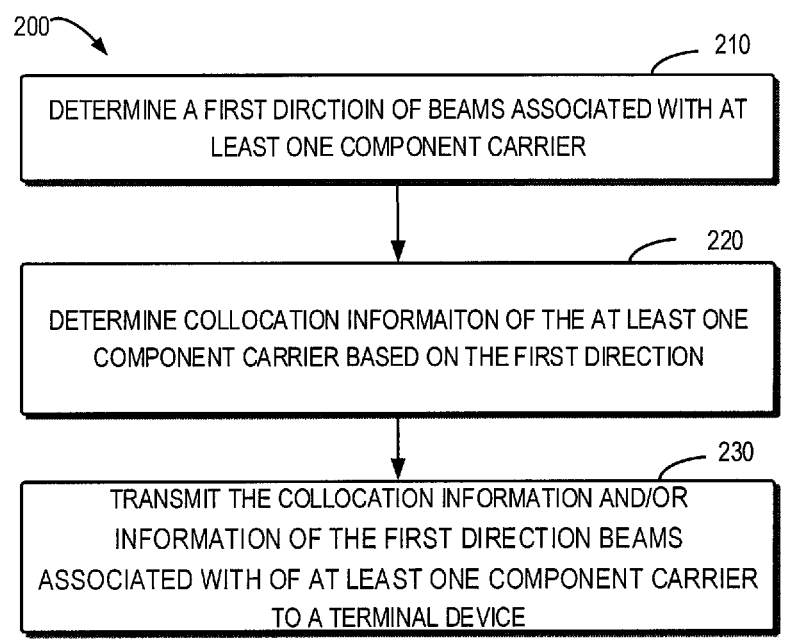
Figure 3:
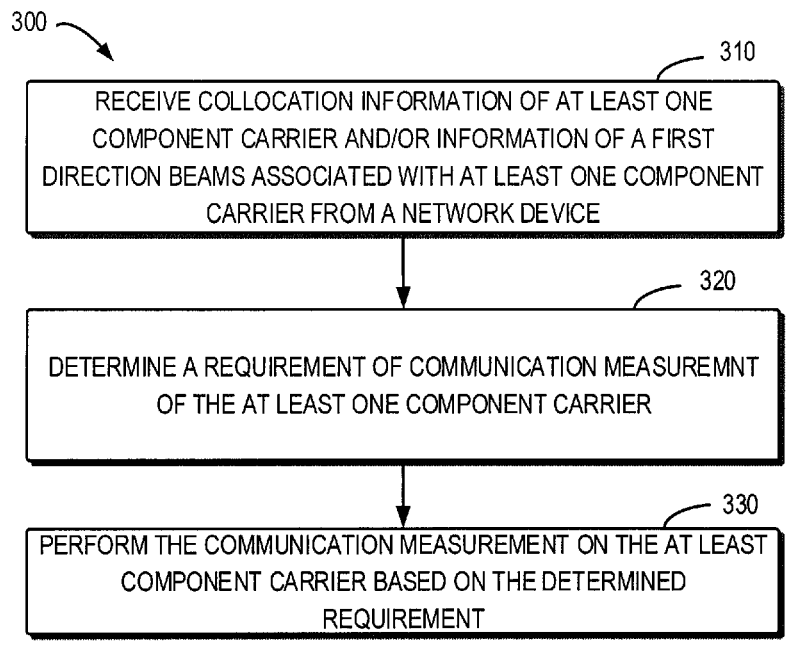
Figure 4:
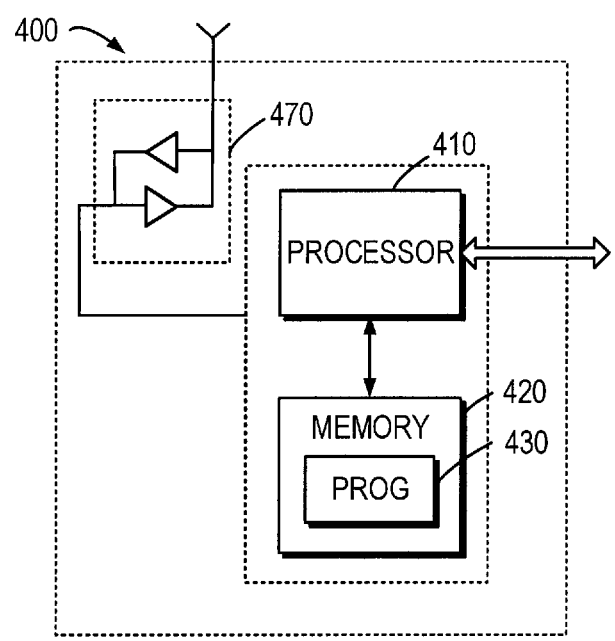

device and a network device according to embodiments of the present disclosure;

FIG. 2 illustrates a flow chart of a method implemented at a network device for communication according to embodiments of the present disclosure;

FIG. 3 illustrates a flow chart of a method implemented at a terminal device for communication according to embodiments of the present disclosure; and FIG. 4 illustrates a schematic diagram of a device according to embodiments of the present disclosure.

Throughout the figures, same or similar reference numbers indicate same or similar elements.

DETAILED DESCRIPTION OF EMBODIMENTS

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "intra-frequency measurement" used herein refers to measuring a signal quality of a serving and/or target cell if the target cell is at the same frequency band as the current serving cell of the terminal device. The term "inter-band measurement" used herein refers to measuring a signal quality of a target cell if the target cell is at a different frequency band from the current serving cell of the terminal device.

The term "component carrier" used herein refers to each carrier in the carrier aggregation. The term "primary component carrier" used herein refers to the main carrier in any group.

As described above, the terminal device needs to perform the communication measurements on carrier components. Some agreements shown below have been reached for measurement requirement. The term "FR1" used herein refers to the frequency range which is below 6 GHz and the term "FR2" used herein refers to the frequency range which is above 24 GHz Requirement for FR1

For each intra-frequency layer, the terminal device shall be capable of monitoring at least 8 cells. For each intra-frequency layer, during each layer 1 measurement period, the terminal device shall be capable of monitoring at least 14 SSBs (synchronization block) with different SSB index and/or PCI on the intra-frequency layer, where the number of SBBs in the serving cell (except for the Secondary Cell, SCell) is no smaller than the number of configured radio link monitoring reference signal (RLM-RS) SSB resources.

Requirements for FR2

For each intra-frequency layer, the terminal device shall be capable of monitoring at least 6 cells on a single serving carrier out of all the serving carriers configured in the same band.

For each intra-frequency layer, during each layer 1 measurement period, the terminal device shall be capable monitoring at least 24 SSBs with different SSB index and/or PCI on a single serving carrier (for example, PCC or PSCC or 1 SCC if PCC/PSCC is in a band different from SCC) out of all the serving carriers configured in the same band. The terminal device shall be capable of monitoring 1-4 SSBs on serving cell for each of the other serving carriers in the same band. The terminal device shall be capable of performing reference signal received power (RSRP) and/or reference signal received quality (RSRQ) on all above mentioned SSBs.

From the agreements, it can be seen that the terminal device may not perform cell detection on intra-band secondary component carrier except for one main component carrier. Further, whether the terminal device may measure 1, 2, 3 or 4 SSB based beams per intra-band secondary component carrier has not been agreed.

Further, the communication measurements may burden the terminal device. In particular, considering FR2 where the measurement bandwidth for SSB with 240 kHz leads to high sampling rate and memory requirements on the terminal deice side. In addition, it has been decided that the initial phase on new radio will include up to 8 component carriers intra-band carrier aggregation, which cover up to 800 MHz. Thus, research on how to limit the terminal device measurement requirements to reduce the overall terminal device complexity and power consumption needs to be done.

In convention technologies, as the initial phase of new radio convers up to 8 component carriers intra-band carrier aggregation (CA), the terminal device may only measure 1 component carrier per band and other component carriers within the same band (intra-frequency CCs) do not need to be measured. However, in the above solution, it is questioned that how the network would be able to receive load information from other component carriers unless they are measured.

The number of SSB based beams that the terminal device needs to monitor has not been decided yet. In conventional technologies, if the terminal device measures one intra-band component carrier, the measured results of this one component carrier may be representing any measurements on all other component carriers in the same intra-band as the measured component carrier. That is to say, the terminal device would need to perform measurements on one intra-band component carriers and would not need to measure any other intra-band component carrier than the main component carrier. However, the above solution depends on the network deployment and cannot be used as generic assumption for developing generic terminal device measurement requirements.

Moreover, in conventional technologies, if all intra-band component carriers are collocated, having same directional orienteering (or direction) and have same or similar coverage (for example, same transmission power and same beam coverage pattern), the measurement effort and burden of the terminal device may be reduced. However, the above solution may be too limiting for further deployment of the network.

Further, it is not clear what is needed on the network side in terms of performance of measurement of the terminal device and information for measurement assistance information.

In conventional technologies, in LTE carrier aggregation, the terminal device may measure any configured component carrier according to communication measurement requirements, with different measurement period for deactivated SCells than for activated SCells. These requirements may be assumed baseline for new radio. However, in the current agreements, these requirements may not be suitable.

In order to at least in part solve above and other potential problems, embodiments of the present disclosure provide a solution for new radio management measurement. Now some example embodiments of the present disclosure are described below with reference to the figures. However, those skilled in the art would readily appreciate that the detailed description given herein with respect to these figures is for explanatory purpose as the present disclosure extends beyond theses limited embodiments.

Figure 1:
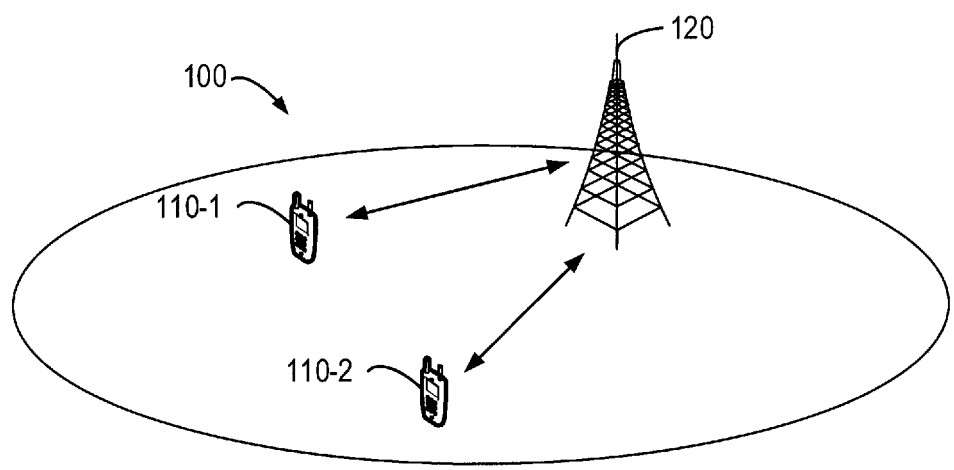
FIG. 1 illustrates a schematic diagram of a communication system according to embodiments of the present disclosure.

FIG. 1 illustrates a schematic diagram of a communication system in which embodiments of the present disclosure can be implemented. The communication system 100, which is a part of a communication network, includes a network device 120 and one or more terminal devices 110-1 and 110-2. It is to be understood that the communication system 100 may include any suitable number of terminal devices. It should be noted that the communication system 100 may also include other elements which are omitted for the purpose of clarity. The network device 120 may communicate with the terminal devices 110. It is to be understood that the number of network devices and terminal devices shown in FIG. 1 is given for the purpose of illustration without suggesting any limitations. The communication system 100 may include any suitable number of network devices and terminal devices.

Communications in the communication system 100 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

According to embodiments of the present disclosure, the network device 120 may transmit collocation information of component carriers to the terminal device 110. For example, the network device 120 will indicate to the terminal device 110 if the terminal device 110 can assume same channel conditions for component carrier (CC) (e.g. intra-band CCs) and therefore terminal device 110 would be allowed to relax measurements requirements on some CCs compared to the main CC. The terminal device 110 may perform measurements based on the collocation information. In this way, the measurement effort and burden of the terminal device 110 may be reduced while flexibility of the network deployment is stilled maintained.

It should be noted that embodiments of the present disclosure are described with intra-band measurement only for the purpose of illustrations not limitation. Those skilled in the art will appreciate that embodiments of the present disclosure can be implemented with nay suitable communication measurements. For example, the measurements may comprise at least one of intra-band measurement, inter-band measurement and radio resource management (RRM) measurement. The present disclosure is not limited in this aspect.

FIG. 2 illustrates a flow chart of method 200 according to embodiments of the present disclosure. The method 200 may be implemented at the network device 120.

At block 210, the network device 120 determines a first direction of beams associated with one or more component carrier. In some embodiments, the network device 120 may determine the first direction based on the direction of the transmitted antenna.

At block 220, the network device 120 determines collocation information of the one or more component carrier. The collocation information indicates that whether the one or more component carriers are collocated with other component carrier and information of beam direction associated with at least one component carrier. If two component carriers are collocated with each other, it means they have the same channel conditions. The network device 120 may determine whether the component carriers are collocated with each other based on their configurations. The collocation information may also include quasi co-located (QCL) information.

In an example embodiment, the network device 120 may compare the first direction of the one or more component carriers with a second direction of beams associated with a primary component carrier.

If the similarity value between the first direction and the second direction exceeds a threshold similarity, the network device 120 may determine that the one or more component carrier is collocated with the primary component carrier and having same beam direction. If the similarity value between the first direction and the second direction does not exceed the threshold similarity, the network device 120 may determine that the one or more component carriers are non-collocated with the primary component carrier or collocated but not having same beam direction.

In other embodiments, the network device 120 may compare the first direction with a third direction of beams associated with a set of component carriers. If the similarity value between the first direction and the third direction exceeds a threshold value, the network device 120 may determine that the one or more component carriers and the set of component carriers can be grouped as a collocated group with a same beam direction or beam angle. In other embodiments, the one or more component carriers and the set of component carriers can be grouped as a collocated group without a same beam direction or beam angle.

At block 230, the network device 120 transmits at least one of the collocation information and information of the first direction beams associated with of the at least one component carrier of the one or more component carrier to the terminal device 110. In some embodiments, the network device 120 determines a primary component carrier from the collocated group of component carriers. The terminal device 120 may transmit information of the determined primary component carrier as below shown in Table 1.

TABLE 1

| | | |
|---|---|---|
| SCellConfig ::= | SEQUENCE { | |
| sCellIndex | SCellIndex, | |
| sCellConfigCommon | SemingCellConfigCommon | OPTIONAL,  --Cond SCellAdd |
| sCellConfigDedicated | ServingCellConfig | OPTIONAL,  --Cond SCellAddMod |
| ... | | |
| } | | |
| ServingCellConfig ::= | SEQUENCE { | |
| tdd-UL-DL-ConfigurationDedicated | TDD-UL-DL-ConfigDedicated | OPTIONAL,  -- Cond TDD |
| initialDownlinkBWP | BWP-DownlinkDedicated | OPTIONAL,  --  Cond ServCellAdd |
| downlinkBWP-ToReleaseList | SEQUENCE (SIZE (1..maxNrofBWPs)) OF BWP-Id OPTIONAL,  -- Need N | |
| downlinkBWP-ToAddModList | SEQUENCE  (SIZE  (1..maxNrofBWPs))  OF  BWP-Downlink OPTIONAL,  --Need N | |
| firstActiveDownlinkBWP-Id | BWP-Id | OPTIONAL,  --  Cond SyncAndCellAdd |
| bwp-InactivityTimer | ENUMERATED { ms2, ms3, ms4, ms5, ms6, ms8, ms10, ms20, ms30, ms40,ms50, ms60, ms80, ms100, ms200, ms300, ms500, ms750, ms1280, ms1920, ms2560, spare10, spare9, spare8, spare7, spare6, spare5, spare4, spare3, spare2, spare1 }  OPTIONAL,  -- Need R | |
| defaultDownlinkBWP-Id | BWP-Id | OPTIONAL,  --Need S |
| uplinkConfig | UplinkConfig | OPTIONAL,  --  Cond ServCellAdd-UL |
| supplementalyUplink | UplinkConfig | OPTIONAL,  --  Cond ServCellAdd-SUL |
| pdcch-ServingCellConfig | SetupRelease { PDCCH-ServingCellConfig } OPTIONAL, -- Need M |
| pdsch-ServingCellConfig | SetupRelease { PDSCH-ServingCellConfig } OPTIONAL, -- Need M |
| csi-MeasConfig | SetupRelease { CSI-MeasConfig } | OPTIONAL, -- Need M |
| sCellDeactivationTimer | ENUMERATED { ms20, ms40, ms80, ms160, ms200, ms240, ms320, ms400, ms480, ms520, ms640, ms720, ms840, ms1280, spare2,spare1 } | |
| crossCarrierSchedulingConfig | CrossCarrierSchedulingConfig | OPTIONAL,  --Need M |
| tag-Id | TAG-Id, | |
| ue-BeamLockFunction | ENUMERATED {enabled} | OPTIONAL,  -- Need R |
| pathlossReferenceLinking | ENUMERATED {pCell, sCell} | OPTIONAL,  --  Cond SCellOnly |
| servingCellMO | MeasObjectId | OPTIONAL,  --  Cond MeasObject |
| ..., | | |
| [[   collocatedWithServCell | ServCellIndex | OPTIONAL,  --  Cond SCellOnly |
| relaxedMeasurements | ENUMERATED {true} | OPTIONAL  --  Cond SCellOnly |
| ]] | | |
| } | | |

ServingCellConfig field descriptions
collocatedWithServCell
Indicates that the configured serving cell is collocated with another serving cell. UE measurement requires for collocated serving cells as specified in 38.133 [X].
relaxedMeasurements
Indicates that the SCell is measured using relaxed requirements as specified in 38.133 [X].

In some embodiments, the network device 120 may directly indicate the terminal device 110 whether the terminal device 110 needs to explicitly measure the one or more component carrier or not. Such indication may be explicitly signaled. Alternatively, such indication may be transmitted via the existing measCycleScell. Table 2 shown below is an example signaling.

TABLE 2

```
SCellConfig ::=                    SEQUENCE {
   sCellIndex                         SCellIndex,
   sCellConfigCommon                  ServingCellConfigCommon        OPTIONAL,   -- Cond SCellAdd
   sCellConfigDedicated               ServingCellConfig              OPTIONAL,   -- Cond SCellAddMod
   ...
}
ServingCellConfig ::=              SEQUENCE {
   tdd-UL-DL-ConfigurationDedicated   TDD-UL-DL-ConfigDedicated      OPTIONAL,   -- Cond TDD
   initialDownlinkBWP                 BWP-DownlinkDedicated          OPTIONAL,   -- Cond
ServCellAdd
   downlinkBWP-ToReleaseList          SEQUENCE (SIZE (1..maxNrofBWPs)) OF BWP-Id OPTIONAL,   --
Need N
   downlinkBWP-ToAddModList           SEQUENCE (SIZE (1..maxNrofBWPs)) OF BWP-Downlink
OPTIONAL,   --Need N
   firstActiveDownlinkBWP-Id          BWP-Id                         OPTIONAL,   -- Cond
SyncAndCellAdd
   bwp-InactivityTimer                ENUMERATED { ms2, ms3, ms4, ms5, ms6, ms8, ms10, ms20, ms30,
                                                 ms40,ms50, ms60, ms80, ms100, ms200, ms300,
ms500,
                                                 ms750, ms1280, ms1920, ms2560, spare10,
spare9, spare8,
                                                 spare7, spare6, spare5, spare4, spare3, spare2,
spare1 }   OPTIONAL,   -- Need R
   defaultDownlinkBWP-Id              BWP-Id                         OPTIONAL,   --Need S
   uplinkConfig                       UplinkConfig                   OPTIONAL,   -- Cond
ServCellAdd-UL
   supplementaiyUplink                UplinkConfig                   OPTIONAL,   -- Cond
ServCellAdd-SUL
   pdcch-ServingCellConfig            SetupRelease { PDCCH-ServingCellConfig }   OPTIONAL,   -- Need
M
   pdsch-ServingCellConfig            SetupRelease { PDSCH-ServingCellConfig }   OPTIONAL,   -- Need
M
   csi-MeasConfig                     SetupRelease { CSI-MeasConfig }            OPTIONAL,   --
Need M
   sCellDeactivationTimer             ENUMERATED { ms20, ms40, ms80, ms160, ms200, ms240,
                                                 ms320, ms400, ms480, ms520, ms640, ms720,
                                                 ms840, ms1280, spare2,spare1}
   crossCarrierSchedulingConfig       CrossCarrierSchedulingConfig   OPTIONAL,   --Need M
   tag-Id                             TAG-Id,
   ue-BeamLockFunction                ENUMERATED {enabled}           OPTIONAL,   --
Need R
   pathlossReferenceLinking           ENUMERATED {pCell, sCell}      OPTIONAL,   -- Cond
SCellOnly
   servingCellMO                      MeasObjectId                   OPTIONAL,   -- Cond
MeasObject
   ...,
   [[   sCellNotMeasured              ENUMERATED {true}              OPTIONAL  --
Cond SCellOnly
   ]]
```

ServingCellConfig field descriptions
sCellNotMeasured
Indicates that UE is not required to measure this SCell as specified in 38.133 [X].
relaxedMeasurements: Indicates that the SCell is measured using relaxed requirements as specified in 38.133.

Alternatively, the network device 120 may indicate whether the terminal device 110 needs to explicitly measure the component carrier or not. Such indication may be explicitly signaled or it can be done by not configuring any measurement cycle for the component carrier (for example, measCycleScell). Table 3 shown below is an example signaling.

TABLE 3

```
MeasObjectNR : :=          SEQUENCE {
   ssbFrequency               ARFCN-ValueNR  OPTIONAL,   -- Cond
SSBorAssociatedSSB
   measCycleSCell             MeasCycleSCell OPTIONAL,   -- Need
R
   ...
}
MeasCycleSCell : :=        ENUMERATED {sf160, sf256, sf320, sf512,
                                      sf640, sf1024, sf1280, sfNone}
```

In some embodiments, if the network device 120 determines that the one or more component carriers are collocated with the other component carrier, the collocation information may indicate that the one or more component carriers are collocated with the other component carrier. In other embodiments, if the network device 120 determines that the one or more component carriers are non-collocated with the other component carrier, the collocation information may indicate that the one or more component carriers are non-collocated with the other component carrier. In some embodiments, the other component carrier may be a primary component carrier.

In an example embodiment, if the network device 120 determines that the one or more component carriers and the set of component carriers belong to the same collocated group, the collocation information may comprise the indexes of the one or more component carries and the set of component carriers.

As described above, the collocation information may also refer to the indication that indicates whether the terminal device 110 needs to perform communication measurement on the one or more component carrier.

In other embodiments, the collocation information may also comprise the measurement requirements of the one or more component carrier, which will be explained later.

FIG. 3 illustrates a flow chart of a method 300. The method 300 may be implemented at the terminal device 110.

At block 310, the terminal device 110 receives collocation information of at least one component carrier and/or information of a first direction beams associated with of the at least one component carrier from the network device 110. In some embodiments, the collocation information may directly indicate whether the terminal device 110 need to perform the communication measurement on the at least one component carrier or not or perform reduced amount of communication measurements. For example, if the collocation information indicates that the one or more component carrier is the primary component carrier, the terminal device 110 may need to perform the communication measurements on the one or more component carrier.

Alternatively, the collocation information may comprise indexes of a collocated group of component carrier which includes the one or more component carrier. The terminal device 110 may determine a primary component carrier from the collocated group. For example, if there is a component carrier of a primary cell, this component carrier may be determined as the primary component carrier. If the component carriers in the collocated group are all component carriers of the SCell, the terminal device 110 may determine the primary component carrier randomly. Alternatively, the collocation information may indicate the primary component carrier determined by the network device 120.

At block 320, the terminal device 110 determines a requirement of communication measurement of the one or more component carrier based on the collocation information and/or the information of a first direction beams associated with of the one or more component carriers. In some embodiments, if the terminal device 110 determines that the one or more component carriers are primary carriers or non-collocated with other main carriers, the terminal device 110 determines that a regular communication measurement is performed on the one or more component carrier. For example, the terminal device 110 needs to measure RSRP and RSRQ and measure a minimum number of SSB based beams on the one or more component carrier. In a further embodiment, the terminal device 110 may need to perform periodic neighbor cell search on other component carriers. The primary component carrier may be determined by the terminal device 110 based on predetermined conditions. Alternatively, the primary component carrier may be indicated by the network device 120.

In other embodiments, if the terminal device 110 determines that the one or more component carriers are collocated with other carriers and the one or more component carriers are not the primary carrier component, the terminal device 110 determines that a reduced communication measurement is performed on the one or more component carrier. For example, the terminal device 110 may not need to measure the one or more component carriers at all. In this way, the measurement effort and power consumption of the terminal device 110 can be reduced significantly. Alternatively or in addition, in the collocation information indicates that the one or more component carriers have a same beam direction with other component carriers (for example, a primary component carrier), the terminal device 110 may also determine to perform a reduced communication measurement on the one or more component carrier.

In a further example, the terminal device 110 may determine to only measure received signal strength indicator (RSSI) if the component carriers are not the primary carrier component. Alternatively or in addition, the terminal device 110 may determine not to measure RSPP/RSRQ measurement on the one or more component carrier. In other embodiments, the terminal device 110 may determines that only one SSB per component carrier need to be measured. In some embodiments, the terminal device 1101 may determine not to perform neighbor cell search on other intra-b and component carrier.

As discussed above, the requirement of communication measurement may be determined by the terminal device 110. Alternatively, the requirement of communication measurement may be configured by the network device 120.

At block 330, the terminal device 110 performs the communication measurement on the one or more component carriers based on the determined requirement. For example:

1) The requirements specify the terminal device measurement effort on the collocated CC (which could be different than for the non-collocated CCs). The network device 120 indicates the cell with which the collocation can be assumed (for example, as shown above in the signalling, via the field collocatedWithServCell).

2) The network device 120 indicates whether the terminal device 110 reduced measurement requirements applies for the CC (e.g. via the presence of the field relaxedMeasurements in signaling example above).

Based on these requirements, the terminal device 110 may perform measurements accordingly.

In an embodiment, the terminal device 110 may not need to measure any of the intra-band CCs other than the main CC, which would significantly reduce the UE measurement effort and power consumption.

In some embodiments, if collocation information indicates that the one or more component carriers cannot be assumed collocated with any main CC (for example, via absence of the collocation indication field or via setting the collocated id to the same as the parent serving cell id), the terminal device 110 may perform measurements on the one or more component carriers accordingly. That is to say, the terminal device 110 may perform regular measurements on the one or more component carriers on a number of cells and beams.

As discussed above, if the one or more component carriers are collocated with other component carrier and are not the primary component carriers, the terminal device 110 may perform partial communication measurement on the one or more component carriers. For example, the terminal device 110 may only provide layer 1 (L1) RSRP result without any layer 3 (L3) filtering. The terminal device 110 may also only provide cell detected/not detected information.

That is to say, some measurement parameters do not need to be measured. In this way, the measurement effort and power consumption of the terminal device 110 can be reduced significantly.

In some embodiments, an apparatus for performing the method 200 (for example, the network device 120) may comprise respective means for performing the corresponding steps in the method 200. These means may be implemented in any suitable manners. For example, it can be implemented by circuitry or software modules.

In some embodiments, the apparatus comprises: means for determining a first direction of beams associated with at least one component carrier; means for determining collocation information of the at least one component carrier based on the first direction, the collocation information indicating whether the at least one component carrier being collocated; and means for transmitting, to a terminal device, the collocation information of the at least one component carrier and/or information of a first direction beams associated with of at least one component carrier.

In some embodiments, the means for determining the collocation information of the at least one component carrier comprises: means for comparing the first direction of beams associated with the at least one component carrier with a second direction of beams associated with a primary component carrier; and means for determining the collocation information of the at least one component carrier based on the comparison.

In some embodiments, the means for transmitting the collocation information of the at least one component carrier comprises: means for in response to a similarity value between the first direction and the second direction exceeding a threshold value and the at least one component carrier being collocated with the primary carrier, determining the at least one component carrier having a same beam direction with the primary component carrier; and means for transmitting, to the terminal device, the collocation information indicating at least one component carrier being collocated with the primary component carrier and the at least one component carrier having a same beam direction with the primary component carrier.

In some embodiments, the means for transmitting the collocation information of the at least one component carrier comprises: means for in response to a similarity value between the first direction and the second direction being below a threshold value and the at least one component carrier being collocated with the primary carrier, determining the at least one component carrier being collocated with the primary component carrier and the at least one component carrier having a different beam direction with the primary component carrier; and means for transmitting, to the terminal device, the collocation information indicating the at least one component carrier being collocated with the primary component carrier and the at least one component carrier having a different beam direction with the primary component carrier.

In some embodiments, the means for transmitting the collocation information of the at least one component carrier comprises: means for in response to a similarity value between the first direction and the second direction exceeding a threshold value and the at least one component carrier being non-collocated with the primary carrier, determining the at least one component carrier having a same beam direction with the primary component carrier; and means for transmitting, to the terminal device, the collocation information indicating at least one component carrier being non-collocated with the primary component carrier and the at least one component carrier having a same beam direction with the primary component carrier.

In some embodiments, the means for determining the collocation information of the at least one component carrier comprises: means for comparing the first direction of beams associated with the at least one component carrier with a third direction of beams associated with a set of component carriers; and means for determining the collocation information of the at least one component carrier based on the comparison.

In some embodiments, the means for transmitting the collocation information of the at least one component carrier comprises: means for in response to a similarity value between the first direction and the third direction exceeding a threshold value and the at least one of component carrier being collocated with the set of component carriers, determining the at least one of component carrier having a same beam direction with the set of component carriers; and means for transmitting, to the terminal device, the collocation information indicating the at least one of component carrier being collocated with the set of component carriers and the at least one of component carrier having a same beam direction with the set of component carriers and the collocation information comprising indexes of the at least one component carrier and the set of component carriers.

In some embodiments, the apparatus further comprises: means for determining a primary component carrier from at least one component carrier and the set of component carriers; and means for transmitting, to the terminal device, the collocation information comprising an index of the determined primary component carrier.

In some embodiments, an apparatus for performing the method 300 (for example, the terminal device 110) may comprise respective means for performing the corresponding steps in the method 300. These means may be implemented in any suitable manners. For example, it can be implemented by circuitry or software modules.

In some embodiments, the apparatus comprises: means for receiving, from a network device, collocation information of at least one component carrier and/or information of a first direction beams associated with of at least one component carrier, the collocation information indicating whether the at least one component carrier being collocated; means for determining a requirement of communication measurement of the at least one component carrier based on the collocation information and/or the information of the first direction beams associated with of at least one component carrier; and means for performing the communication measurement on the at least one component carrier based on the determined requirement.

In some embodiments, the means for determining the requirement comprises: means for in response to the collocation information indicating at least one of the at least one component carrier being collocated with another component carrier and at least one component carrier having a same beam direction with the other component carrier, determining the requirement to indicate one of the followings: the communication measurement being null, measurement parameters excluding at least one of: reference signal received power and reference signal received quality, measurement parameters only including received signal strength indication, and measurement parameters including one synchronization block.

In some embodiments, the apparatus further comprises: means for in response to determining the at least one of component carrier being collocated with the set of component carriers, determining a primary component carrier from at least one component carrier and the set of component carriers.

In some embodiments, the means for determining the requirement comprises: means for in response to the primary component carrier excluding the at least one component carrier, determining the requirement to indicate one of the followings: the communication measurement being null, measurement parameters excluding at least one of: reference signal received power and reference signal received quality, measurement parameters only including received signal strength indication, and measurement parameters including one synchronization block on the least one component carrier.

In some embodiments, the means for determining the requirement comprises: means for in response to determining at least one of: the at least one of component carrier being collocated with the set of component carriers and the at least one of component carrier having a same beam direction with the set of component carriers, determining a primary component carrier from at least one component carrier and the set of component carriers; and means for in response to the at least one component carrier being the primary component carrier, determining the requirement to indicate one of the followings: measurement parameters including at least one of: a reference signal received power, a reference signal received quality received signal strength indication, and more than one synchronization block on the at least one component carrier; and performing neighbor cell search.

In some embodiments, the collocation information comprises an index of the determined primary component carrier.

In some embodiments, the means for determining the requirement comprises: means for determining at least one of: at least one component carrier being non-collocated with another component carrier and the at least one of component carrier having a different beam direction with the other component carrier, determining the requirement to indicate one of the followings: measurement parameters including at least one of: a reference signal received power, a reference signal received quality received signal strength indication, and more than one synchronization block on the at least one component carrier; and performing neighbor cell search.

FIG. 4 is a simplified block diagram of a device 400 that is suitable for implementing embodiments of the present disclosure. The device 400 may be implemented at the network device 120. The device 400 may also be implemented at the terminal device 110. As shown, the device 400 includes one or more processors 410, one or more memories 420 coupled to the processor(s) 410, one or more transmitters and/or receivers (TX/RX) 440 coupled to the processor 410.

The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 420 stores at least a part of a program 430. The TX/RX 440 is for bidirectional communications. The TX/RX 440 has at least one antenna to facilitate communication, though in practice an Access Node mentioned in this application may have several ones. The communication interface may represent any interface that is necessary for communication with other network elements.

The program 430 is assumed to include program instructions that, when executed by the associated processor 410, enable the device 400 to operate in accordance with the embodiments of the present disclosure, as discussed herein with reference to FIGS. 2-3. That is, embodiments of the present disclosure can be implemented by computer software executable by the processor 410 of the device 400, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A communication method, comprising:
  determining a first direction of beams associated with at least one component carrier;
  determining collocation information of the at least one component carrier based on the first direction, the collocation information being associated with at least one radio link monitoring reference signal and indicating whether the at least one component carrier being collocated; and
  transmitting, to a terminal device, the collocation information or information of the first direction of beams associated the at least one component carrier.

2. The method of claim 1, wherein determining the collocation information of the at least one component carrier comprises:
  comparing the first direction of beams associated with the at least one component carrier with a second direction of beams associated with a primary component carrier; and
  determining the collocation information of the at least one component carrier based on the comparison.

3. The method of claim 2, wherein transmitting the collocation information of the at least one component carrier comprises:
  in response to a similarity value between the first direction and the second direction exceeding a threshold value and the at least one component carrier being collocated with the primary carrier, determining the at least one component carrier having a same beam direction with the primary component carrier; and
  transmitting, to the terminal device, the collocation information indicating at least one component carrier being collocated with the primary component carrier and the at least one component carrier having a same beam direction with the primary component carrier.

4. The method of claim 2, wherein transmitting the collocation information of the at least one component carrier comprises:
  in response to a similarity value between the first direction and the second direction being below a threshold value and the at least one component carrier being collocated with the primary carrier, determining the at least one component carrier being collocated with the primary component carrier and the at least one component carrier having a different beam direction with the primary component carrier; and
  transmitting, to the terminal device, the collocation information indicating the at least one component carrier being collocated with the primary component carrier and the at least one component carrier having a different beam direction with the primary component carrier.

5. The method of claim 2, wherein transmitting the collocation information of the at least one component carrier comprises:
  in response to a similarity value between the first direction and the second direction exceeding a threshold value and the at least one component carrier being non-collocated with the primary carrier, determining the at least one component carrier having a same beam direction with the primary component carrier; and
  transmitting, to the terminal device, the collocation information indicating at least one component carrier being non-collocated with the primary component carrier and the at least one component carrier having a same beam direction with the primary component carrier.

6. The method of claim 1, wherein determining the collocation information of the at least one component carrier comprises:
  comparing the first direction of beams associated with the at least one component carrier with a third direction of beams associated with a set of component carriers; and
  determining the collocation information of the at least one component carrier based on the comparison.

7. The method of claim 6, wherein transmitting the collocation information of the at least one component carrier comprises:
  in response to a similarity value between the first direction and the third direction exceeding a threshold value and the at least one of component carrier being collocated with the set of component carriers, determining the at least one of component carrier having a same beam direction with the set of component carriers; and
  transmitting, to the terminal device, the collocation information indicating the at least one of component carrier being collocated with the set of component carriers and the at least one of component carrier having a same beam direction with the set of component carriers and the collocation information comprising indexes of the at least one component carrier and the set of component carriers.

8. The method of claim 7, further comprising:
  determining a primary component carrier from at least one component carrier and the set of component carriers; and
  transmitting, to the terminal device, the collocation information comprising an index of the determined primary component carrier.

9. A non-transitory computer readable medium storing instructions thereon, the instructions, when executed by at least one processing unit of a machine, causing the machine to perform the method according to claim 1.

10. A communication method, comprising:
  receiving, from a network device, collocation information of at least one component carrier or information of a first direction beams associated with of the at least one component carrier, the collocation information being associated with at least one radio link monitoring reference signal and indicating whether the at least one component carrier being collocated;
  determining a requirement of communication measurement of the at least one component carrier based on the collocation information and/or the information of the first direction of beams; and
  performing the communication measurement on the at least one component carrier based on the determined requirement.

11. The method of claim 10, wherein the determining the requirement comprises:
  in response to determining at least one of the at least one component carrier being collocated with another component carrier and at least one component carrier having a same beam direction with the other component carrier, determining the requirement to indicate one of the followings:
  the communication measurement being null,
  measurement parameters excluding at least one of: reference signal received power and reference signal received quality, measurement parameters only including received signal strength indication, and measurement parameters including one synchronization block.

12. The method of claim 10, further comprising:

in response to determining the at least one of component carrier being collocated with the set of component carriers, determining a primary component carrier from at least one component carrier and the set of component carriers.

13. The method of claim 12, wherein determining the requirement comprises:

in response to the primary component carrier excluding the at least one component carrier, determining the requirement to indicate one of the following:

the communication measurement being null, measurement parameters excluding at least one of: reference signal received power and reference signal received quality, measurement parameters only including received signal strength indication, and measurement parameters including one synchronization block on the least one component carrier.

14. The method of claim 12, wherein determining the requirement comprises:

in response to determining at least one of: the at least one of component carrier being collocated with the set of component carriers and the at least one of component carrier having a same beam direction with the set of component carriers, determining a primary component carrier from at least one component carrier and the set of component carriers; and in response to the at least one component carrier being the primary component carrier, determining the requirement to indicate one of the following:

measurement parameters including at least one of: a reference signal received power, a reference signal received quality received signal strength indication, and more than one synchronization block on the at least one component carrier; and performing neighbor cell search.

15. The method of claim 12, wherein the collocation information comprises an index of the determined primary component carrier.

16. The method of claim 10, wherein determining the requirement comprises:

in response to determining at least one of: at least one component carrier being non-collocated with another component carrier and the at least one of component carrier having a different beam direction with the other component carrier, determining the requirement to indicate one of the following:

measurement parameters including at least one of: a reference signal received power, a reference signal received quality received signal strength indication, and more than one synchronization block on the at least one component carrier; and performing neighbor cell search.

17. A non-transitory computer readable medium storing instructions thereon, the instructions, when executed by at least one processing unit of a machine, causing the machine to perform the method according to claim 10.

18. A network device, comprising:

at least one processor; and at least one memory including computer program code;

the at least one memory and computer program code configured to, with the at least one processor, cause the network device to perform:

determining a first direction of beams associated with at least one component carrier;

determining collocation information of the at least one component carrier based on the first direction, the collocation information being associated with at least one radio link monitoring reference signal and indicating whether the at least one component carrier being collocated; and transmitting, to a terminal device, the collocation information or information of the first direction of beams associated the at least one component carrier.

19. The network device of claim 18, wherein determining the collocation information of the at least one component carrier comprises:

comparing the first direction of beams associated with the at least one component carrier with a second direction of beams associated with a primary component carrier; and determining the collocation information of the at least one component carrier based on the comparison.

20. The network device of claim 19, wherein transmitting the collocation information of the at least one component carrier comprises:

in response to a similarity value between the first direction and the second direction exceeding a threshold value and the at least one component carrier being collocated with the primary carrier, determining the at least one component carrier having a same beam direction with the primary component carrier; and transmitting, to the terminal device, the collocation information indicating at least one component carrier being collocated with the primary component carrier and the at least one component carrier having a same beam direction with the primary component carrier.

21. The network device of claim 19, wherein transmitting the collocation information of the at least one component carrier comprises:

in response to a similarity value between the first direction and the second direction being below a threshold value and the at least one component carrier being collocated with the primary carrier, determining the at least one component carrier being collocated with the primary component carrier and the at least one component carrier having a different beam direction with the primary component carrier; and transmitting, to the terminal device, the collocation information indicating the at least one component carrier being collocated with the primary component carrier and the at least one component carrier having a different beam direction with the primary component carrier.

22. The network device of claim 19, wherein transmitting the collocation information of the at least one component carrier comprises:

in response to a similarity value between the first direction and the second direction exceeding a threshold value and the at least one component carrier being non-collocated with the primary carrier, determining the at least one component carrier having a same beam direction with the primary component carrier; and transmitting, to the terminal device, the collocation information indicating at least one component carrier being non-collocated with the primary component carrier and the at least one component carrier having a same beam direction with the primary component carrier.

23. The network device of claim 18, wherein determining the collocation information of the at least one component carrier comprises:

comparing the first direction of beams associated with the at least one component carrier with a third direction of beams associated with a set of component carriers; and determining the collocation information of the at least one component carrier based on the comparison.

24. The network device of claim 23, wherein transmitting the collocation information of the at least one component carrier comprises:
in response to a similarity value between the first direction and the third direction exceeding a threshold value and the at least one of component carrier being collocated with the set of component carriers, determining the at least one of component carrier having a same beam direction with the set of component carriers; and
transmitting, to the terminal device, the collocation information indicating the at least one of component carrier being collocated with the set of component carriers and the at least one of component carrier having a same beam direction with the set of component carriers and the collocation information comprising indexes of the at least one component carrier and the set of component carriers.

25. The network device of claim 23, wherein the at least one memory and computer program code are further configured, with the at least one processor, to cause the network device to perform:
determining a primary component carrier from at least one component carrier and the set of component carriers; and
transmitting, to the terminal device, the collocation information comprising an index of the determined primary component carrier.

26. A terminal device, comprising:
at least one processor; and
at least one memory including computer program code;
the at least one memory and computer program code configured to, with the at least one processor, cause the terminal device to perform:
receiving, from a network device, collocation information of at least one component carrier or information of a first direction beams associated with of the at least one component carrier, the collocation information being associated with at least one radio link monitoring reference signal and indicating whether the at least one component carrier being collocated;
determining a requirement of communication measurement of the at least one component carrier based on at least one of the collocation information and the information of the first direction of beams; and
performing the communication measurement on the at least one component carrier based on the determined requirement.

27. The terminal device of claim 26, wherein the determining the requirement comprises:
in response to determining at least one of: at least one component carrier being collocated with another component carrier and at least one component carrier having a same beam direction with the other primary component carrier, determining the requirement to indicate one of the followings:
the communication measurement being null,
measurement parameters excluding at least one of: reference signal received power and reference signal received quality,
measurement parameters only including received signal strength indication, and
measurement parameters including one synchronization block.

28. The terminal device of claim 26, wherein the at least one memory and computer program code are further configured, with the lat least one processor, to cause the terminal device to perform:
in response to determining the at least one of component carrier being collocated with the set of component carriers, determining a primary component carrier from at least one component carrier and the set of component carriers.

29. The terminal device of claim 28, wherein determining the requirement comprises:
in response to the primary component carrier excluding the at least one component carrier, determining the requirement to indicate one of the following:
the communication measurement being null,
measurement parameters excluding at least one of: reference signal received power and reference signal received quality,
measurement parameters only including received signal strength indication, and
measurement parameters including one synchronization block on the least one component carrier.

30. The terminal device of claim 28, wherein determining the requirement comprises:
in response to determining at least one of the at least one of component carrier being collocated with the set of component carriers and the at least one of component carrier having a same beam direction with the set of component carriers, determining a primary component carrier from at least one component carrier and the set of component carriers; and
in response to the at least one component carrier being the primary component carrier, determining the requirement to indicate one of the following:
measurement parameters including at least one of: a reference signal received power, a reference signal received quality received signal strength indication, and more than one synchronization block on the at least one component carrier; and
performing neighbor cell search.

31. The terminal device of claim 28, wherein the collocation information comprises an index of the determined primary component carrier.

32. The terminal device of claim 26, wherein determining the requirement comprises:
in response to determining at least one of: at least one component carrier being non-collocated with another component carrier and the at least one of component carrier having a different beam direction with the other component carrier, determining the requirement to indicate one of the following:
measurement parameters including at least one of: a reference signal received power, a reference signal received quality received signal strength indication, and more than one synchronization block on the at least one component carrier; and
performing neighbor cell search.

* * * * *